(No Model.)

G. H. ALTON & W. O. WAKEFIELD.
COMMUTATOR FOR DYNAMOS, MOTORS, &c.

No. 421,222. Patented Feb. 11, 1890.

Witnesses

Inventor
George H. Alton and
William O. Wakefield.
By their Attorney

UNITED STATES PATENT OFFICE.

GEORGE H. ALTON AND WILLIAM O. WAKEFIELD, OF LYNN, MASSACHUSETTS, ASSIGNORS TO THE THOMSON-HOUSTON ELECTRIC COMPANY, OF CONNECTICUT.

COMMUTATOR FOR DYNAMOS, MOTORS, &c.

SPECIFICATION forming part of Letters Patent No. 421,222, dated February 11, 1890.

Application filed March 8, 1889. Serial No. 302,540. (No model.)

*To all whom it may concern:*

Be it known that we, GEORGE H. ALTON and WILLIAM O. WAKEFIELD, citizens of the United States, and residents of Lynn, in the county of Essex and State of Massachusetts, have invented a certain new and useful Commutator for Dynamo-Electric Generators, Motors, &c., of which the following is a specification.

Our invention relates to the form of the commutator-segments and the manner of securing the same in position, the object being to hold them firmly against displacement, while at the same time permitting their ready removal when worn or damaged and the substitution of new parts or segments.

A further object of the invention is to provide a thorough insulation of the segments from the shell or parts supporting them and from one another, so as to reduce the liability to short circuits or grounds to a minimum.

Our invention consists in providing the commutator segments or strips at their ends with both an outer and an inner bevel, thus giving the end of the segment or strip a V shape when the bevels or inclines are at such an angle as to intersect or meet at the end. We do not limit ourselves to the exact V form, as the bevel might be such as to leave the end of the segment blunt instead of pointed or of a V shape.

Our invention consists, further, in clamping the segments by devices adapted to grasp and clamp the outer and inner bevels of the ends independently, in a manner which will more clearly appear from the following description.

Our invention consists, also, in certain details of construction and combinations of parts to be hereinafter described and more particularly claimed.

Figure 1:
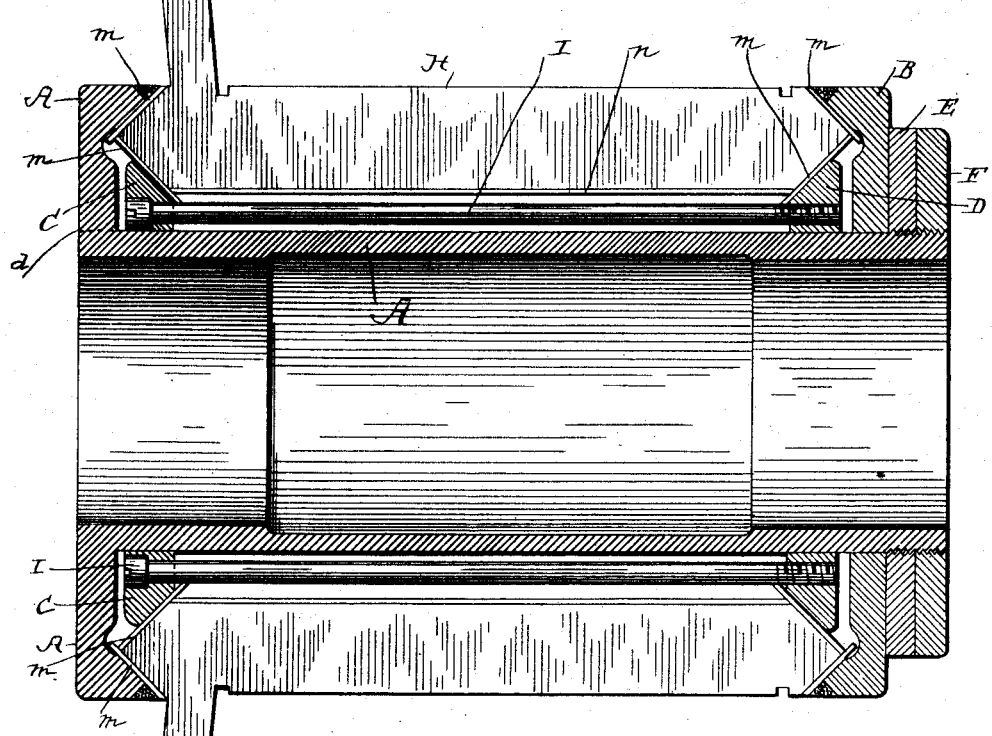
Figure 2:
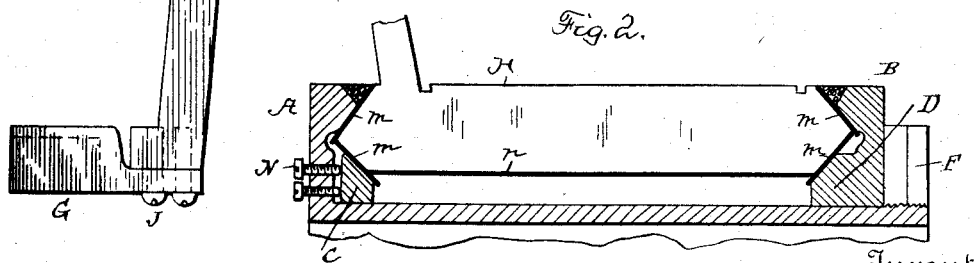

In the accompanying drawings, Figure 1 is a longitudinal section of a commutator embodying our invention. Fig. 2 illustrates a modification.

Referring to Fig. 1, H is a copper segment V-shaped at both ends and having a projection extending upward, to which the leading wires from the armature-coils may be connected in any suitable manner, as by soldering in a piece G, attached to the segment H by screws J. One end of the commutator-shell A is so constructed as to grasp the V-shaped segment on its upper or outer face or bevel, as shown, the corresponding outer bevel or incline at the opposite end being grasped or clamped by a ring or clamping-piece B, having a bevel such as shown and mounted on the shell A, surrounding the armature-shaft or on any other suitable support. The cap or clamping piece B may be forced toward the segment by a nut E upon the cylindrical portion of the shell A or upon other suitable bearing. The usual set-nut for holding nut E is indicated at F. The inner sides of the two bevels are grasped or clamped in seats or bearings C D, properly shaped to receive the bevels or inclines on the segment, and provided with independent devices for fastening or forcing them together with the segment between them.

C D indicate two rings mounted and movable on the commutator-shell or other suitable support, and I indicates a suitable screw or bolt adapted to force the two rings C D toward each other, thus firmly binding the commutator-segments between them. The segments are thoroughly insulated at their ends and at their inner sides from one another and from the shell and supports by sheets or strips *m m* of insulating material—such, for instance, as mica—disposed, as shown, on the bevel or taper surfaces of the segment, where it is firmly held between the segments and the clamping-seats, and by another sheet of insulation *n*, which is sustained, as shown, between the inwardly-inclining pieces *m*, and close up to the inner surfaces of the segments out of contact with the shell or cylinder A.

It is evident that, as shown in Fig. 2, instead of having rings C D both movable and arranged to be forced toward each other by the screw I, either one might be stationary and might form a part of the shell A or the cap B, and the other movable, the movable portion being made to be forced toward the stationary portion by screws extending through the shell A, as indicated at N, or by other devices. The method first described is, however, our preferred construction, since both rings C D are adjustable laterally with respect to the shell A. It is also evident that the shell A might be made in two pieces instead of one, the end or portion which receives the segment ends being secured to the cylindrical portion at the dotted line $d$.

What we claim as our invention is—

1. In a commutator, a segment or plate having a double bevel at its end, in combination with independent clamping seats or bearings engaging, respectively, with the two inclines of said bevel.

2. In a commutator, the combination, with the segments or plates having an inner and outer bevel at each end, of independent clamping seats or supports for the inner and outer bevels, respectively, as and for the purpose described.

3. The combination, with the segments having V-shaped ends, of clamping devices for the outer inclines or bevels, and clamping seats or supports grasping the inner bevels or inclines and adapted to be forced toward one another by clamping devices independent of those for the outer inclines or bevels.

4. In a commutator, the combination, with the segments having V-shaped ends, of a commutator-shell having a clamping-seat for the outer bevel at one end, a cap for the corresponding bevel at the other end, and two independent internal clamping-rings adapted to engage the inner bevels or inclines, as and for the purpose described.

5. The combination, with the segments having V-shaped ends, of the insulating-strips $m$, secured between the bevels or inclines and the clamping-seats, and an interior strip of insulation sustained between the inwardly-inclined strips $m$, substantially as described.

6. The combination, with the commutator-segments having an inner and outer bevel at their ends, of a clamping-seat grasping the outer bevel, and a separate clamp C, adapted to grasp the inner bevel at the same end.

Signed at Lynn, in the county of Essex and State of Massachusetts, this 5th day of March, A. D. 1889.

GEORGE H. ALTON.
WILLIAM O. WAKEFIELD.

Witnesses:
J. W. GIBBONEY,
WM. J. HALL.